US 6,696,773 B2

(12) United States Patent
Taniguchi

(10) Patent No.: US 6,696,773 B2
(45) Date of Patent: Feb. 24, 2004

(54) VEHICLE GENERATOR CONTROL SYSTEM

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/151,987

(22) Filed: May 22, 2002

(65) Prior Publication Data

US 2003/0001435 A1 Jan. 2, 2003

(30) Foreign Application Priority Data

Jun. 29, 2001 (JP) ........................................ 2001-198712

(51) Int. Cl.⁷ ................................................. H02J 7/00
(52) U.S. Cl. .......................................... 307/153; 307/73
(58) Field of Search ............................ 307/13, 18, 43, 307/153, 73; 318/140–158, 807

(56) References Cited

U.S. PATENT DOCUMENTS

| | | | | | |
|---|---|---|---|---|---|
| 4,275,344 A | * | 6/1981 | Mori et al. | ..................... | 322/28 |
| 4,670,705 A | * | 6/1987 | Sievers et al. | ................. | 322/28 |
| 5,182,511 A | | 1/1993 | Pierret et al. | | |
| 5,274,322 A | * | 12/1993 | Hayashi et al. | ................ | 322/90 |
| 5,376,876 A | * | 12/1994 | Bauser et al. | ................. | 322/28 |
| 5,455,500 A | * | 10/1995 | Shichijyo et al. | ............. | 322/90 |
| 5,602,470 A | | 2/1997 | Kohl et al. | | |
| 5,764,036 A | * | 6/1998 | Vaidya et al. | ................. | 322/90 |
| 5,773,964 A | * | 6/1998 | Peter | ........................... | 322/20 |
| 5,886,500 A | * | 3/1999 | Iwatani et al. | ............... | 320/104 |
| 5,907,233 A | * | 5/1999 | Jabaji | ........................... | 322/28 |
| 6,147,474 A | * | 11/2000 | Koss et al. | ..................... | 322/59 |
| 6,204,643 B1 | * | 3/2001 | Kouwa et al. | ................. | 322/28 |
| 6,313,613 B1 | * | 11/2001 | Iwatani et al. | ................. | 322/12 |
| 6,384,551 B1 | * | 5/2002 | Watanabe | .................... | 318/139 |
| 6,420,855 B2 | * | 7/2002 | Taniguchi et al. | ............. | 322/28 |
| 2001/0052761 A1 | | 12/2001 | Taniguchi et al. | | |
| 2002/0024314 A1 | | 2/2002 | Takahashi et al. | | |

FOREIGN PATENT DOCUMENTS

JP          62-44698          3/1987

* cited by examiner

*Primary Examiner*—Gregory J. Toatley, Jr.
*Assistant Examiner*—Sharon A. Polk
(74) *Attorney, Agent, or Firm*—Oliff & Berridge, PLC

(57) ABSTRACT

A generator control system of a vehicle AC generator includes a field coil, a first polyphase armature winding, a second polyphase armature winding, a first rectifier connected to the first armature winding and a second rectifier connected to the second armature winding. The generation control system includes a power transistor connected with the field coil, a voltage regulator for controlling the power transistor, a voltage comparator for providing a pulse signal by comparing output voltage of one of phase-windings of the first armature winding with one of second phase-windings of the second armature winding and a counter circuit for driving the voltage regulator when the number of pulses of the pulse signal becomes larger than a predetermined value.

10 Claims, 8 Drawing Sheets

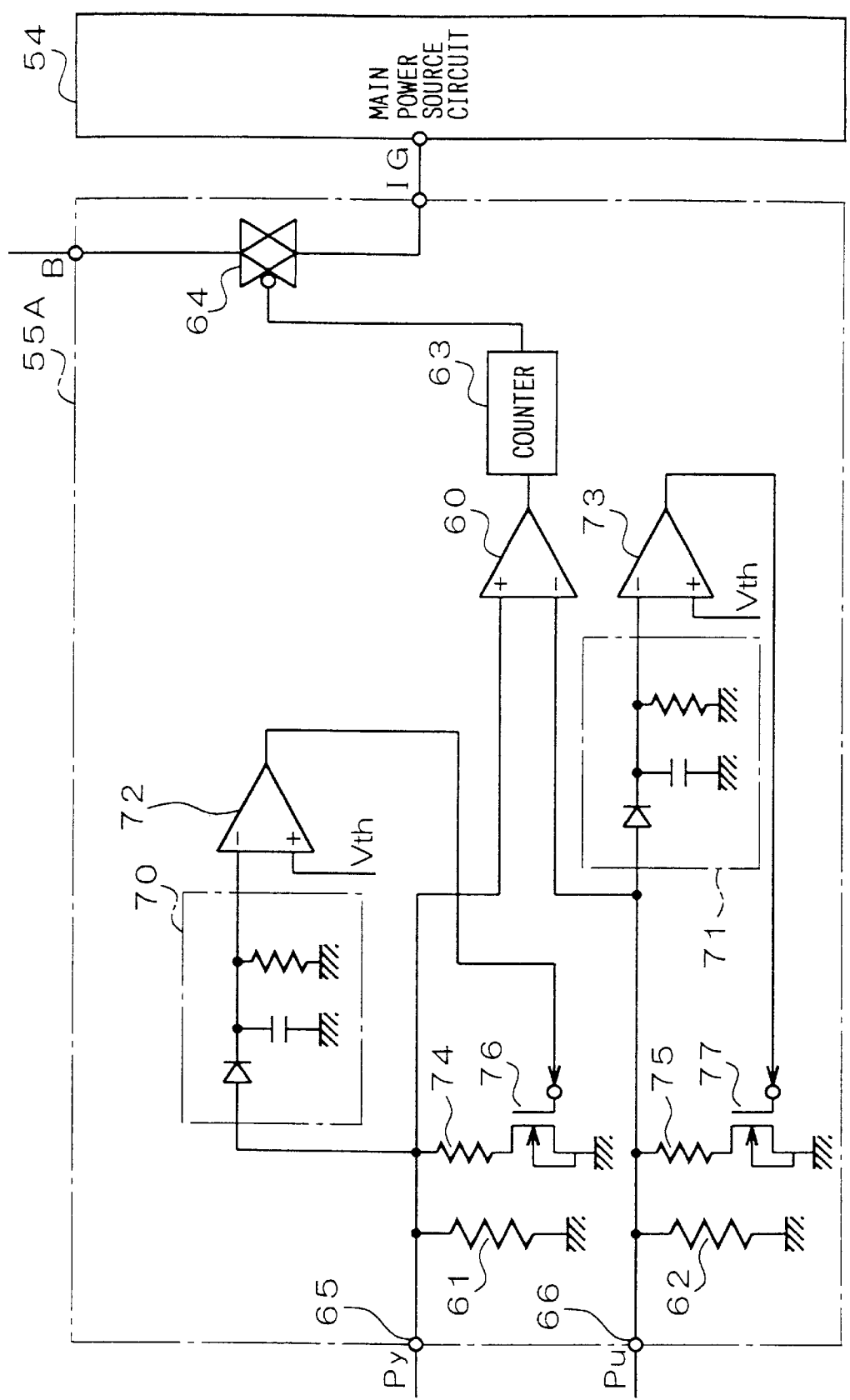

VEHICLE GENERATOR CONTROL SYSTEM

CROSS REFERENCE TO RELATED APPLICATION

The present application is based on and claims priority from Japanese Patent Application 2001-198712, filed Jun. 29, 2001, the contents of which are incorporated herein by reference.

BACKGROUND OF THE INVENTION

1. Field of the Invention

The present invention relates to a vehicle generator control system for controlling output voltage of a vehicle AC generator to be mounted in a passenger car or a truck.

2. Description of the Related Art

In a conventional generator control system for controlling output voltage of a vehicle AC generator, field current is supplied to a generator when a key switch sensor detects turn-on of a key switch. However, it is necessary to provide signal wires for detecting the operation of the key switch.

In another generator control system such as disclosed in JP-U-62-44698, field current is supplied when rotation of a rotor of a vehicle AC generator is detected by a magnetic sensor that detects residual magnetic flux of the rotor. This can omit special signal wires. However, the electromotive force generated by the residual magnetic flux is so small that it is difficult to detect rotation of the rotor accurately. The residual magnetic flux becomes weaker if the AC generator is not operated for a comparatively long time, for example, when a vehicle is shipped abroad.

U.S. Pat. Nos. 5,182,511 and 5,602,470 disclose detector circuits that detect a voltage difference between two phase-windings of a vehicle AC generator, thereby detecting rotation of an engine.

However, those disclosed generator control systems necessitate a special detector circuit, which is a normally closed circuit as shown in FIG. 10. Therefore, it is necessary to provide a protection circuit to prevent a large amount of current from flowing into the detector circuit when the AC generator starts generation. This also makes the voltage control system complicated and expensive.

SUMMARY OF THE INVENTION

Therefore, an object of the present invention is to provide a simple and improved vehicle generator control system that does not require any special wire or circuit for detecting operation of a key switch.

According to a feature of the invention, a generator control system of a vehicle AC generator includes switching means connected in series with a field coil, a voltage regulator for controlling the switching means to thereby control the output voltage of the vehicle AC generator, comparing means for providing a pulse signal by comparing voltage of a phase-winding with voltage of another phase-winding and engine start detecting means for starting operation of a voltage regulator when frequencies of the pulse signal becomes larger than a predetermined value.

Therefore, no closed circuit is formed, so that a large amount of current can be prevented from flowing into the engine start detecting means without providing any protection circuit. In addition, only a low level of voltage difference between two phase-windings is necessary to provide a pulse signal without using a special signal wire.

Preferably, the two phase-windings are 90 degree in electric angle different in phase from each other, in order to detect the engine start accurately.

It is also preferable for the generator control system to include bypassing means for connecting the two phase-windings to a ground if the output voltage of the phase-windings is larger than a threshold value.

As shown in FIG. 11, if leak current flows into a phase-winding Y, the voltage Vpy that is inputted to an engine start detecting circuit drifts from the phase voltage Py of the phase-winding Y by $Vb \times R2/(R1+R2)$, where Vb is terminal voltage of a battery B, R1 is a contact resistance of a portion to which the leak current flows, and R2 is an internal resistance of the engine start detecting circuit. The bypassing means reduces the drift voltage, as shown in FIG. 8.

It is also preferable for generator control system to include means for supplying field current for a predetermined period if the output voltage of one of the two phase-windings becomes higher than a second threshold voltage that is lower than the first threshold voltage.

It is possible to discriminate normal output voltage of one of the phase-windings from drifted output voltage that is caused by by leak current.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 6 is a circuit diagram of an auxiliary power source circuit included in a generator control system according to the second embodiment;

DETAILED DESCRIPTION OF THE PREFERRED EMBODIMENTS

Figure 1:
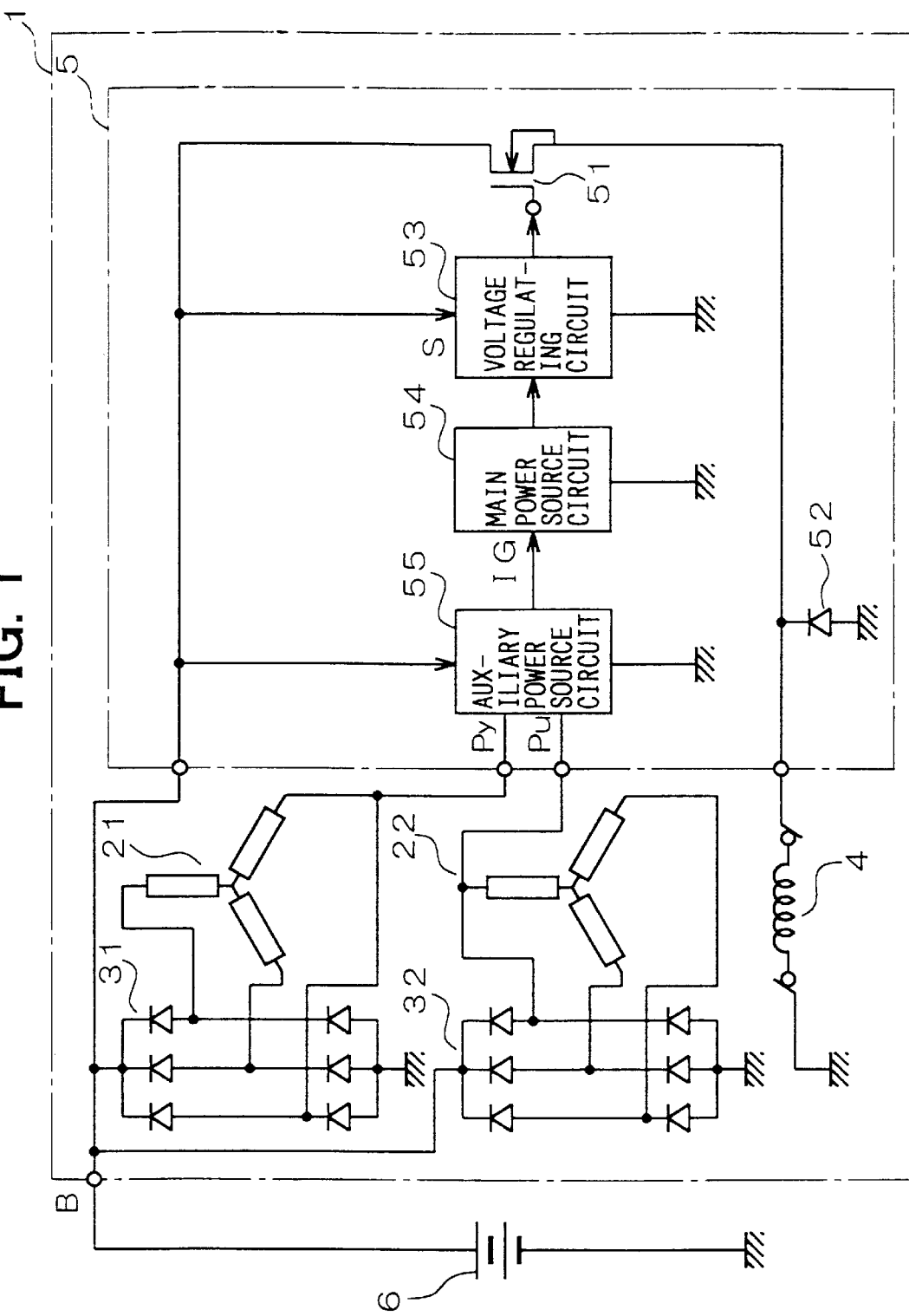
FIG. 1 is a schematic circuit diagram of a vehicle AC generator having a generator control system according to the first embodiment of the invention therein.

A vehicle generator control system according to the first embodiment of the invention is described with reference to FIGS. 1–3. As shown in FIG. 1, a vehicle AC generator 1 is comprised of a pair of armature windings 21, 22, a pair of rectifiers 31, 32, a field coil 4 and a generator control system 5. Each of the pair of armature windings 21, 22 is a polyphase winding (FIG. 1 shows three-phase windings) wound in a common stator core and insulated from the other.

The pair of armature windings 21, 22 is disposed in the stator core to generate voltage of the same phase. The rectifier 31 is a full-wave rectifier that is connected to the armature winding 21 to convert the AC voltage outputted thereby into DC voltage. The rectifier 32 is also a full-wave rectifier that is connected to the armature winding 22 to convert the AC voltage outputted thereby into DC voltage. The field coil 4 forms a magnetic field that interlinks the armature windings 21, 22 when supplied with field current. The field coil 4 is wound around a magnetic pole core and forms a rotor together with the pole core. The generator control system 5 controls the output voltage of the AC generator at a predetermined control voltage Vreg.

The vehicle generator control system 5 is comprised of a power transistor 51, a flywheel diode 52, a voltage regulating circuit 53, a main power source circuit 54 and auxiliary power source circuit 55. The power transistor 51 is connected in series to the field coil 4 to intermittently supply field current. The flywheel diode 52 is connected in parallel to the field coil 4 to circulate the field current when the power transistor 51 is opened. The voltage regulating circuit 53 watches the output voltage of the vehicle AC generator 1 and controls the power transistor 51 to keep the output voltage at regulated voltage Vreg. For example, the voltage regulating circuit 53 closes the power transistor 51 when the output voltage of the vehicle AC generator 1 becomes lower than the regulated voltage Vreg and opens the power transistor 51 when the output voltage becomes higher than the regulated voltage Vreg. The main power source circuit 54 supplies electric power to the voltage regulating circuit 53 to maintain the control operation thereof. The auxiliary power source circuit 55 detects rotation of the vehicle AC generator 1, namely, an engine according to the voltage of one of phase-windings (e.g. Y-phase voltage Py and U-phase voltage Pu) of each of the pair of armature windings 21, 22 and drives the main power source circuit 54.

Figure 2:
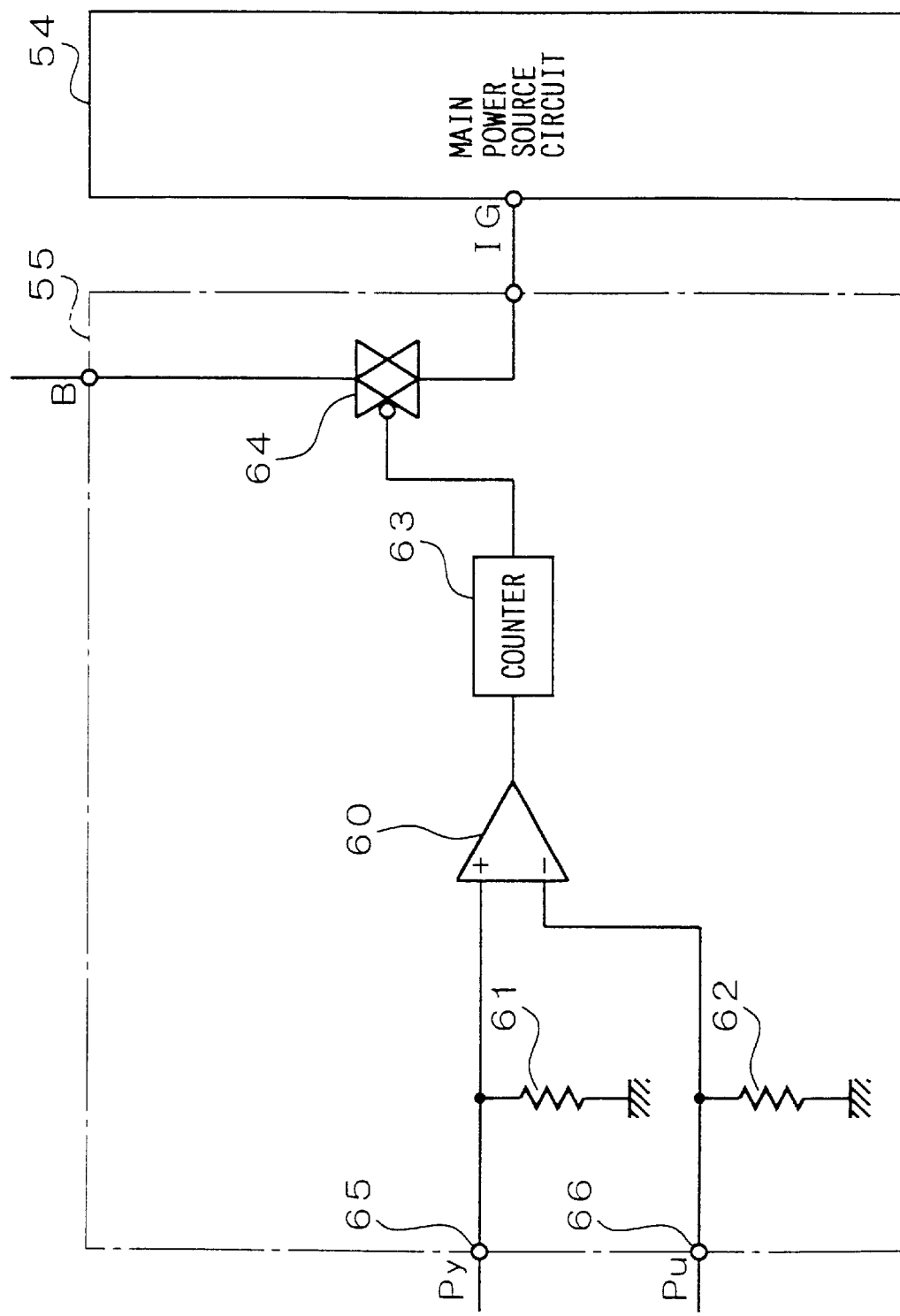
FIG. 2 is a schematic circuit diagram of an auxiliary power source circuit.
Figure 3:
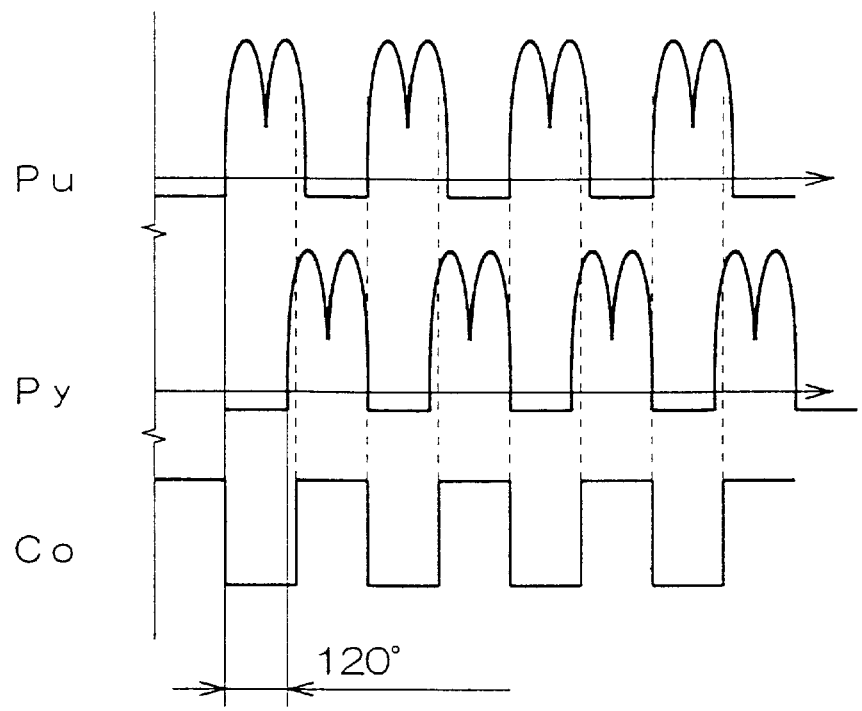
FIG. 3 is a graph showing a wave-shape of voltage inputted into a voltage comparator.

As shown in FIG. 2, the auxiliary power source circuit 55 is comprised of a voltage comparator 60, resistors 61, 62, a counter 63 and an analog switch 64.

The voltage comparator 60 has a positive terminal to which phase voltage Py that is induced in a Y-phase winding of one of the armature winding 21 is applied via an first input terminal 65 and a negative terminal to which phase voltage Pu that is induced in a U-phase winding of the other armature winding 22 is applied via a second input terminal 66. The voltage comparator 60 provides a high level signal if the phase voltage Py on the positive terminal is higher than the phase voltage Pu on the negative terminal and a low level signal if the phase voltage Py on the positive terminal is not higher than the phase voltage Pu on the negative terminal. The resistor 61 is connected between the first input terminal 65 and a ground to bypass a small amount of leak current through the resistor 61 to the ground. The resistor 62 is also connected between the second input terminal 66 and a ground to bypass a small amount of leak current through the resistor 62 to the ground.

The Y-phase winding of the first armature winding 21 and the U-phase winding of the second armature winding 22 are 120 degree in electric angle spaced apart from each other. Therefore, the wave shape of the phase voltage Py and the wave shape of the phase voltage Pu are shifted from each other by 120 degree in electric angle, as shown in FIG. 3. Accordingly, the voltage comparator 60 outputs pulse signals (Co) that have the same frequencies as the phase voltages Py, Pu.

Because the phase voltage of the first armature winding 21, and the phase voltage of the second armature winding 22 that is insulated from the first armature winding 21 are compared by the voltage comparator 60, it is not possible to form any closed circuit. As a result, it is not necessary to provide a protection circuit for protecting the auxiliary power source circuit from a large amount of current. On the other hand, even if the electromotive forces induced in both the first and second armature windings 21, 22 are very small, the voltage difference between two can be detected, Therefore, a pulse signal that responds to the engine rotation can be provided without a special signal wire.

Figure 4:
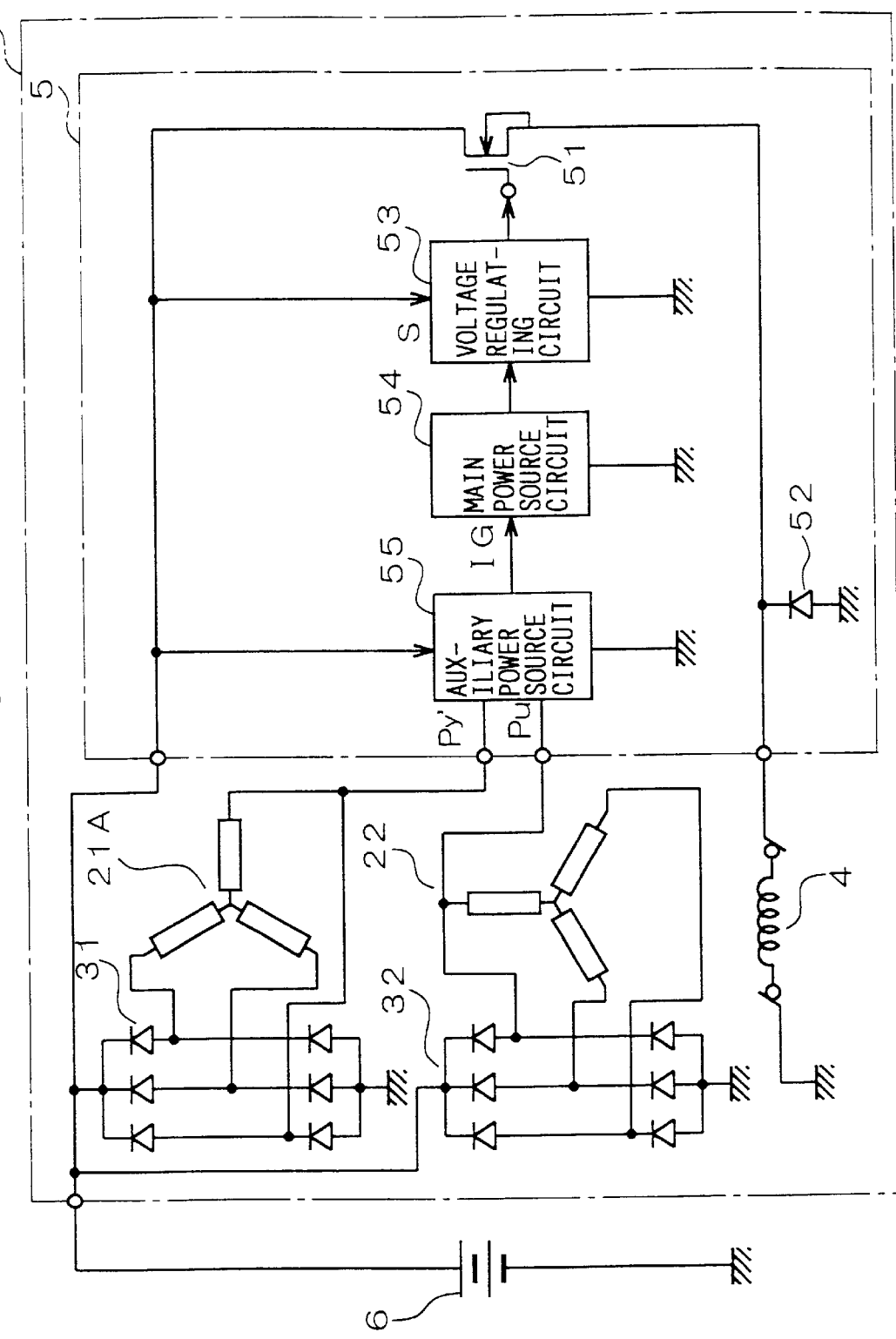
FIG. 4 is a schematic circuit diagram of a variation of the vehicle AC generator shown in FIG. 1.

The vehicle generator control system 5 can be used in a different vehicle AC generator 1A as shown in FIG. 4. The vehicle AC generator 1A has a pair of armature windings 21A and 22 that are 30 degree electric angle shifted from each other. Because the first armature winding 21A and the second armature winding 22 are 30 degree electric angle in phase different from each other, electromagnetic noises and ripples can be reduced. It is also possible to make the phase difference 90 degree in electric angle.

Figure 5:
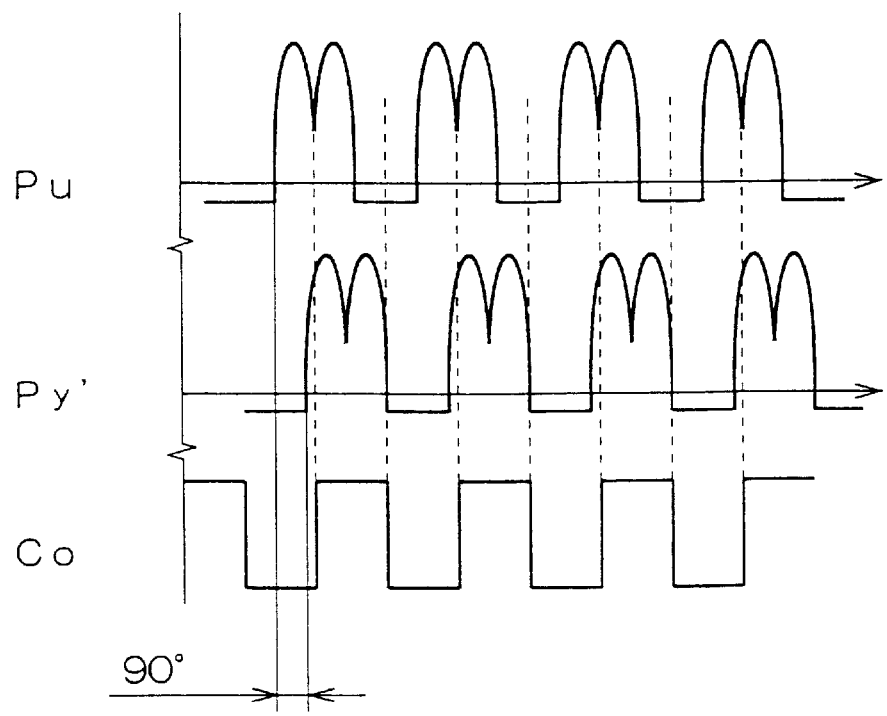
FIG. 5 is a graph showing a wave-shape of voltage inputted into a voltage comparator of an auxiliary power source circuit that is included in the vehicle AC generator shown in FIG. 4.

As shown in FIG. 5, the phase voltages Py' and Pu to be inputted to the auxiliary power source circuit 55 are shifted by 90 degree in electric angle from each other. Therefore, two phase voltages can be compared easily.

A generator control system 5A according to the second embodiment of the invention is described with reference to FIG. 6. The generator control system 5A is the same as the generator control system 5 according to the first embodiment except that an auxiliary power source circuit 55A is different from the auxiliary power source circuit 55 of the first embodiment.

As shown in FIG. 6, the auxiliary power source circuit 55A includes the voltage regulator 60, the resistors 61, 62, the counter 63 and the analog switch 64 that are included in the auxiliary power source circuit 55 of the first embodiment. The auxiliary power source circuit 55A further includes a pair of peak detecting circuits 70 and 71, a pair of voltage comparators 72 and 73, a pair of resistors 74 and 75 and a pair of transistors 76 and 77.

The first peak detecting circuit 70 is comprised of a diode, a capacitor and a resistor and detects the peak value of the phase voltage Py that is induced in the Y-phase winding of the first armature winding 21. The second peak detecting circuit 71 has the same structure as the first peak detecting circuit 70 and detects the peak value of the phase voltage Pu of the U-phase winding of the second armature winding 22.

The voltage comparator 72 has a negative terminal to which the peak value of the phase voltage Py is inputted and a positive terminal to which a suitable threshold value Vth is inputted. If the peak value is lower than the threshold value Vth, the voltage comparator 72 outputs a high level signal to close the transistor 76. The transistor 76 has a gate connected to the output terminal of the voltage comparator 72, a drain connected the first input terminal 65 via the resistor 74 and a source connected to a ground.

The voltage comparator 73 has a negative terminal to which the peak value of the phase voltage Pu is inputted, which is compared with the threshold value Vth that is inputted to the positive terminal of the voltage comparator 73. If the peak value is lower than the threshold value Vth the voltage comparator outputs a high level signal to close the transistor 77. The transistor 77 has a gate connected to the output terminal of the voltage comparator 73, a drain connected to the second input terminal 66 via the resistor 75 and a source connected to the ground.

If the voltage comparator 72 outputs a high level signal to close the transistor 76, the first input terminal 65 is grounded by the resistor 74. The resistance R2 of the resistor 74 is sufficiently smaller than the resistance R1 of the resistor 61 that is connected to the first input terminal 65. For example, R1 is about 1 k$\Omega$ and R2 is about 10 $\Omega$. Therefore, if the amount of leak current is very small, the transistor 76 is kept closed to let the leak current flow to the ground through the resistor 74. For example, if the threshold value Vth of the voltage comparator 72 is 3 V, the transistor 76 is not opened until the amount of leak current becomes larger than 300 mA.

When the engine stops, the transistors 76, 77 are turned on to bypass the leak current via the resistors 74, 75 whose resistance is very low. Therefore, the potential of the input terminals 65, 66 is prevented from being raised by drift voltage, so that the engine starting can be accurately detected.

When the engine starts and the vehicle AC generator 1 starts generation, the transistor 76, 77 are turned off. Therefore, the output power of the vehicle AC generator 1 is prevented from being wasted by the resistors 74, 75.

In the auxiliary power source circuit 55A shown in FIG. 6, field current can be supplied for a predetermined period when one of the output voltages of the peak detecting circuits 70, 71 becomes higher than a threshold voltage Vth2 that is lower than the threshold voltage Vth. If the rotor of the AC generator 1 starts rotation, the phase voltages Py, Pu gradually increase while the drift voltage does not increase. This arrangement can discriminate the voltage induced in the Y-phase or U-phase winding from drift voltage caused by leak current.

Figure 7:
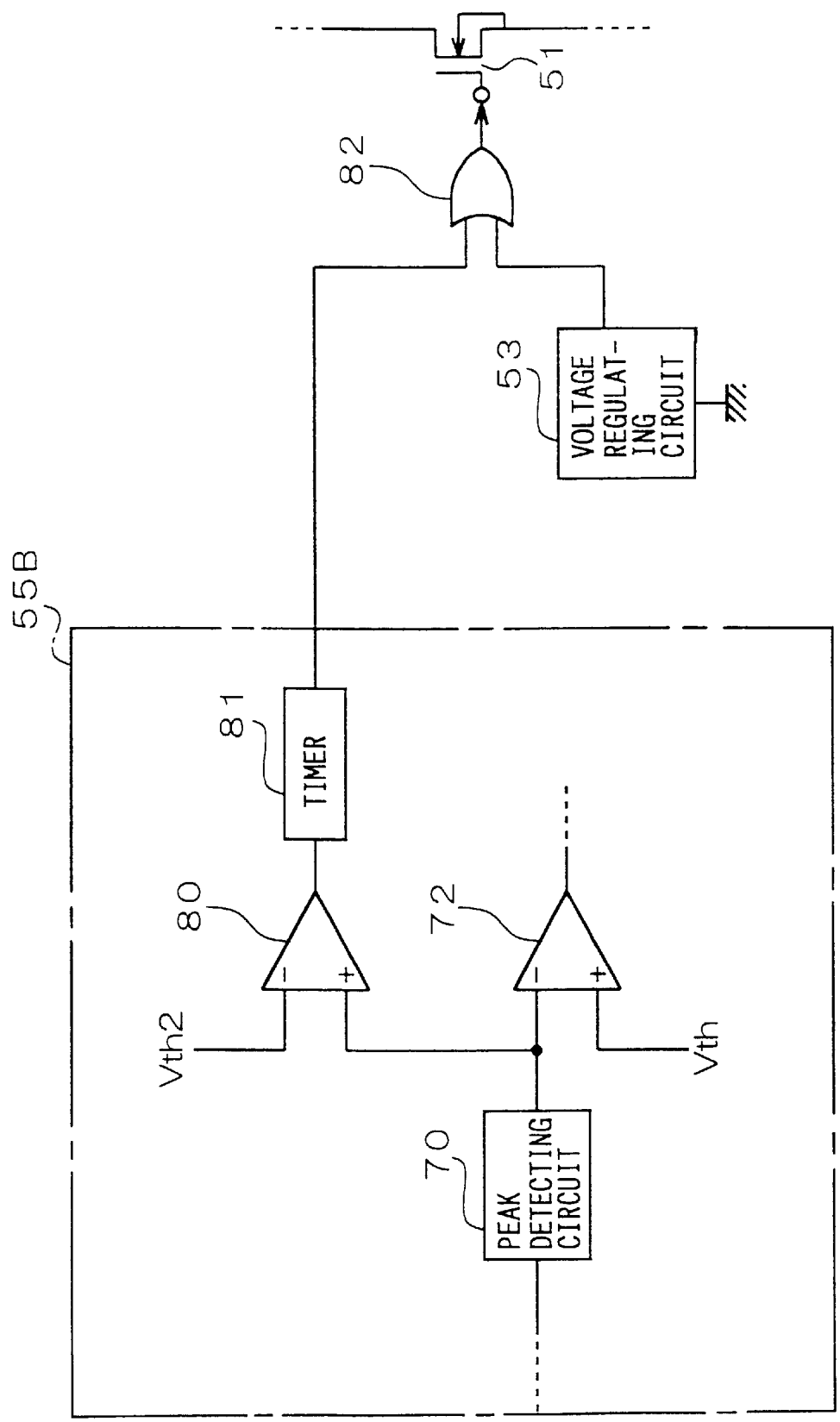
FIG. 7 is a fragmentary circuit diagram of a generator control system having a field current supply control circuit.
Figure 8:
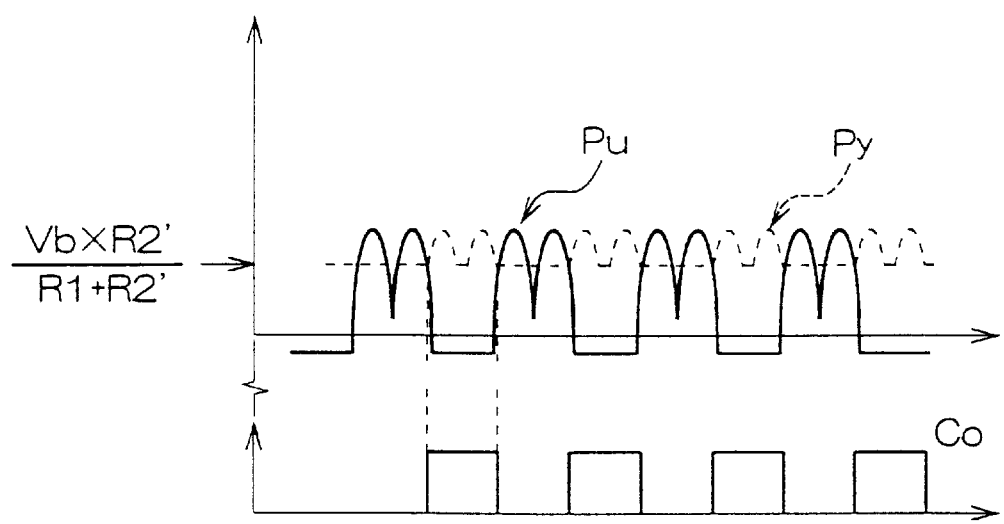
FIG. 8 is a graph showing phase-voltage affected by drift voltage due to leak current.
Figure 9:
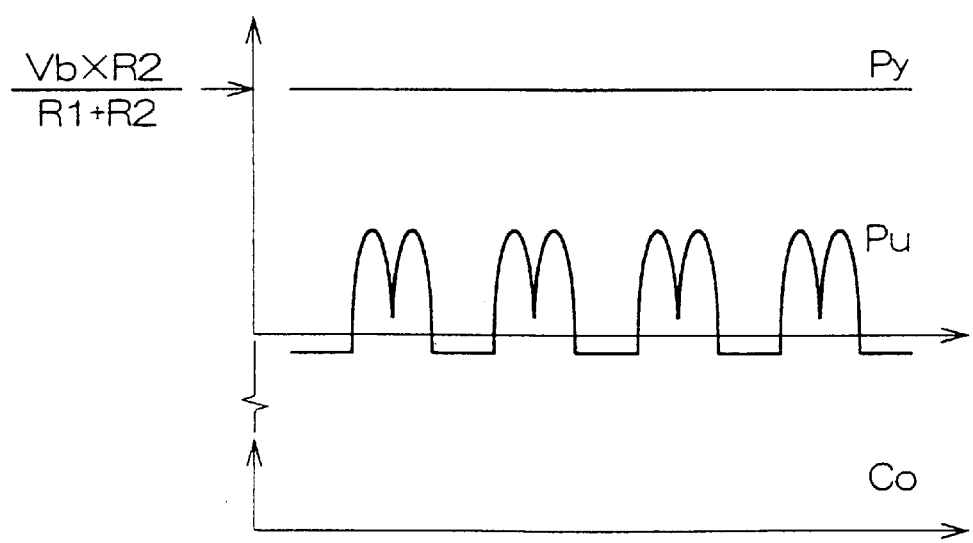
FIG. 9 is a graph showing phase-voltage affected by drift voltage due to leak current.
Figure 10:
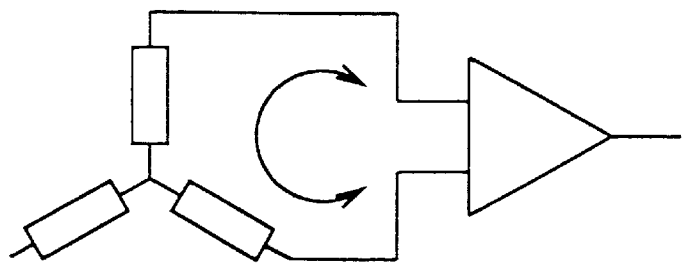
FIG. 10 is an explanatory schematic circuit diagram of a conventional vehicle AC generator.
Figure 11:
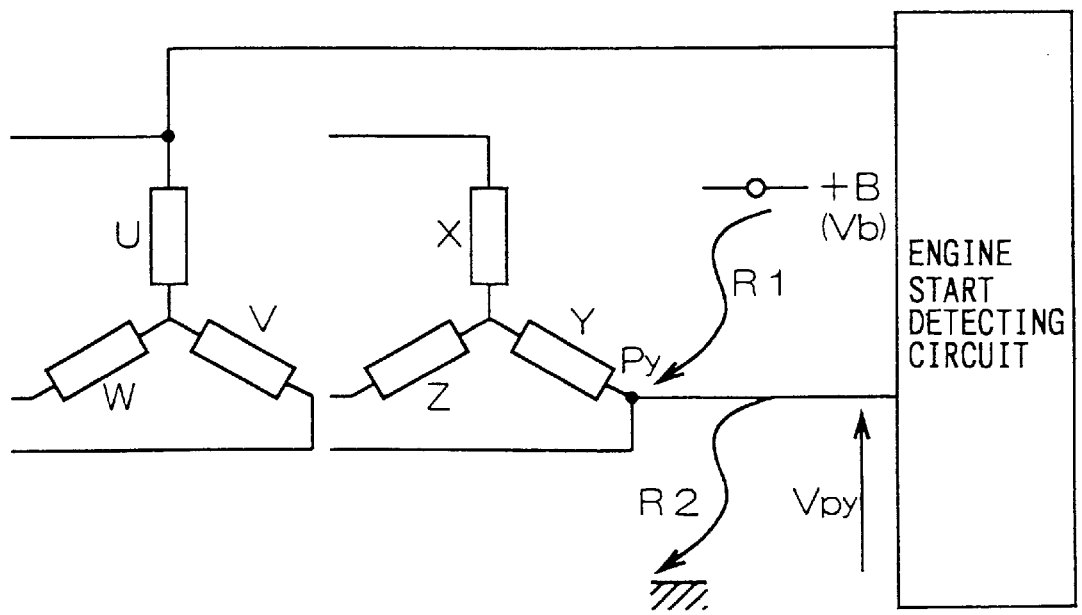
FIG. 11 is an explanatory schematic circuit diagram of a conventional vehicle AC generator.

A generator control system 5B according to the third embodiment of the invention is described with reference to FIG. 7. The generator control system 5B is almost the same as the generator control system 5A according to the second embodiment.

An auxiliary power source circuit 55B is slightly different from the auxiliary power source circuit 55A of the second embodiment, and an OR gate 82 is inserted between the gate of the power transistor 51 and the voltage regulator circuit 53.

The auxiliary power source circuit 55B includes a voltage comparator 80 whose threshold value is Vth2 and a time circuit 81. The voltage comparator 80 is connected to the output terminal of the peak detecting circuit 70. When the output voltage of the peak detecting circuit 70 becomes higher than the threshold value Vth2, the voltage comparator 80 provides a high level output signal to start the timer circuit 81. The timer circuit 81 provides a high level signal for a predetermined period. When the output signal of the timer circuit 81 provides a high level signal, the power transistor 51 is turned on for the predetermined period.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator control system of a vehicle AC generator that includes a rotor having a plurality of magnetic poles and a field coil, a first polyphase armature winding including a first phase-winding, a second polyphase armature winding including a second phase-winding that is different in phase and electrically insulated from said first phase-winding, a first rectifier connected to said first polyphase armature winding and a second rectifier connected to said second polyphase armature winding, said generator control system comprising:

switching means connected in series with said field coil;

a voltage regulator for controlling said switching means to thereby control output voltage of said vehicle AC generator;

comparing means for providing a pulse signal having variable frequencies by comparing voltage of said first phase-winding with voltage of said second phase-winding; and counter means for starting operation of said voltage regulator when said variable frequencies becomes equal to or larger than a predetermined value.

2. The generator control system as claimed in claim 1, wherein said first phase-winding and second phase-winding are 90 degree in electric angle different in phase from each other.

3. The generator control system as claimed in claim 1, further comprising:

a first bypassing means for connecting said first phase-winding to a ground if output voltage of said first phase-winding is larger than a first threshold value, and a second bypassing means for connecting said second phase-winding to said ground if output voltage of said second phase-winding is larger than said first threshold value.

4. The generator control system as claimed in claim 3, further comprising means for supplying field current for a predetermined period if one of output voltages of said first and second phase-windings becomes higher than a second threshold voltage that is lower than said first threshold voltage.

5. The generator control system as claimed in claim 3, wherein each of said first and second bypassing means comprises a switching element and a voltage comparator.

6. A generator control system of a vehicle AC generator that includes a rotor having a plurality of magnetic poles and a field coil, a first polyphase armature winding including a first phase-winding, a second armature winding including a second phase-winding that is different in phase from said first phase winding, a first rectifier connected to said first armature winding and a second rectifier connected to said second armature winding, said generator control system comprising:

switching means connected in series with said field coil;

a voltage regulating circuit for controlling said switching means to thereby control output voltage of said vehicle AC generator;

a main power source for supplying electric power to said voltage regulating circuit to maintain the control operation of said switching means;

an auxiliary power source circuit for driving said main power source circuit according to voltage of one of phase-windings of each of the pair of armature windings;

wherein said auxiliary power source circuit comprises comparing means for providing a pulse signal by comparing voltage of said first phase-winding with voltage of said second phase-winding and counter means for operating said voltage regulator when the number of pulses of said pulse signal becomes equal to or larger than a predetermined value.

7. The generator control system as claimed in claim 6, wherein said first phase-winding and second phase-winding are 90 degree in electric angle different in phase from each other.

8. The generator control system as claimed in claim 7, further comprising:

a first bypassing means for connecting said first phase-winding to a ground if output voltage of said first phase-winding is larger than a first threshold value, and a second bypassing means for connecting said second phase-winding to said ground if output voltage of said second phase-winding is larger than said first threshold value.

9. The generator control system as claimed in claim 8, further comprising means for supplying field current for a predetermined period if one of output voltages of said first and second phase-windings becomes higher than a second threshold voltage that is lower than said first threshold voltage.

10. The generator control system as claimed in claim 9, wherein each of said first and second bypassing means comprises a switching element and a voltage comparator.

* * * * *